United States Patent [19]

Mills et al.

[11] Patent Number: 4,971,860

[45] Date of Patent: Nov. 20, 1990

[54] POLYESTER SHEET MATERIALS AND MOLDED ARTICLES AND METHODS FOR THE MANUFACTURE THEREOF

[75] Inventors: David E. Mills; Harry R. Musser, both of Kingsport; Burns Davis, deceased, late of Kingsport, all of Tenn., by Anne Davis, executrix

[73] Assignee: Eastman Kodak Company, Rochester, N.Y.

[21] Appl. No.: 315,646

[22] Filed: Feb. 27, 1989

[51] Int. Cl.$^5$ .......................... B32B 27/36; B05D 3/02
[52] U.S. Cl. ..................................... 428/332; 264/235; 427/374.1; 427/374.2; 427/379; 428/480
[58] Field of Search .............................. 428/480, 332; 427/374.1, 374.2, 379; 264/235

[56] References Cited

PUBLICATIONS

Japanese Published Patent Application, 49-082,743 (Translation).
Japanese Published Patent Application 50-067,892 (Translation).
Japense Published Patent Application, 53-086,769 (Translation).
Japanese Published Patent Application, 58-065,657 (Tanslation).

*Primary Examiner*—Thomas J. Herbert
*Attorney, Agent, or Firm*—J. Frederick Thomsen; William P. Heath, Jr.

[57] ABSTRACT

Unoriented polyester sheet materials and molded articles having a thickness of at least 10 mil and having excellent clarity and heat stability. The polyester used in the manufacture of the sheet materials and molded articles are derived from terephthalic acid and 1,4-butanediol and certain modifying monomers. Methods for manufacturing the aforesaid sheet materials and molded articles.

24 Claims, No Drawings

POLYESTER SHEET MATERIALS AND MOLDED ARTICLES AND METHODS FOR THE MANUFACTURE THEREOF

This invention pertains to novel, unoriented polyester sheet material and molded articles and to processes for the manufacture thereof. More specifically, this invention pertains to novel, unoriented polyester sheet material and molded articles having excellent clarity and dimensional stability when exposed to elevated temperatures.

Many types of polyesters have been proposed for use in the manufacture of packaging materials for foods, beverages, pharmaceutical preparations and the like in which a high degree of heat-stability and transparency are required. However, the means for obtaining polyester sheet materials and other shaped articles which have the requisite thickness for use in packaging materials and excellent transparency, i.e., clarity, and dimensional stability when exposed to elevated temperatures has not been known previously.

Japanese Kokai (published patent application) No. 58-065,657 discloses a process for producing transparent, biaxially oriented, heat-stable films from polyesters containing at least 70 mole percent poly(tetramethylene terephthalate) units. This reference discloses the preparation of thin films, e.g., less than 5 mil thickness, from both unmodified and modified poly(tetramethylene terephthalate). Japanese Kokai No. 50-067,892 discloses the manufacture of nonstretched films at least 500 $\mu$m from polyesters containing greater than 80 mole percent poly(tetramethylene terephthalate). Although the films are described as having good transparency, this reference does not disclose films which have both good transparency and heat stability after exposure to elevated temperatures.

Japanese Kokai No. 49-082,743 describes the extrusion of poly(tetramethylene terephthalate) film onto a roll at 50° C. to give an 80-m$\mu$ film and the vacuum forming of the film at 60° C. to give a transparent container. This reference claims that both unmodified poly(tetramethylene terephthalate) and poly(tetramethylene terephthalate) modified with up to 40 mole percent of bifunctional compounds having a molecular weight of less than 400 give transparent articles. However, no heat treatment to impart heat stability to the container is disclosed. Japanese Kokai No. 53-086,769 discloses that polyesters derived from 1,4-butanediol, terephthalic acid and 10 to 40 mole percent (based on total dicarboxylic acids) of bifunctional compounds having a molecular weight of less than 400 may be extruded into tubes, quenched and heat set at greater than 100° C. to give transparent tubes. However, the light transmission data given for a tube extruded from a polyester derived from dimethyl terephthalate, dimethyl isophthalate and 1,4-butanediol which had been quenched and heat set indicates the tube had poor transparency or clarity.

A. Escala and R. S. Stein, in *Multiphase Polymers*, S. L. Cooper and G. M. Estes, eds., *American Chemical Society Advances in Chemistry*, 176, 455–487 (1979) qualitatively describe the crystallization of unmodified poly(tetramethylene terephthalate) to give clear films but they do not describe any modified poly(tetramethylene terephthalate) polyesters or any method to obtain transparent articles. We have found that an extruded sheet of unmodified poly(tetramethylene terephthalate) cannot, at least not in a practical manner, be quenched or cooled with sufficient rapidity to prevent crystallization, or partial crystallization, of the polyester. Crystallization to any significant degree causes the shaped article to have a high haze value, thereby rendering it unsuitable for use in packaging materials which require a high degree of clarity.

We have discovered a method for manufacturing substantially unoriented, shaped polyester articles having a thickness of at least 10 mil (254 $\mu$m), a haze value of not more than about 10 nephelometric units and a heat stability (heat distortion temperature; ASTM D1637) of at least 70° C. Such articles are useful as packaging materials for comestibles and pharmaceutical preparations which are destined for exposure to elevated temperatures, e.g., from 80° to 180° C. For example, the polyester articles provided by our invention may be used to package intravenous fluids which require sterilization or prepared foods which are destined for heating or cooking in a microwave oven.

The polyesters useful in accordance with our invention are modified poly(tetramethylene terephthalate) polymers which contain the following components:

A. dicarboxylic acid residues having the structure:

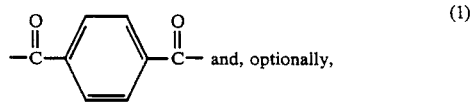

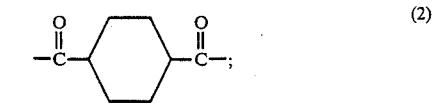

B. diol residues having the structure:
 (1) —OCH$_2$CH$_2$CH$_2$CH$_2$O— and, optionally,
 (2) —OCH$_2$CH$_2$O— and/or
 (3) —OCH$_2$CH$_2$OCH$_2$CH$_2$O—; and, optionally,
C. dicarboxylic acid and/or diol residues other than components A and B;

wherein the polyester is constituted of about 87.5 to 95 mole percent of components A(1) and B(1); about 5 to 12.5 mole percent of components A(2), B(2) and/or B(3); and 0 to about 2.5 mole percent of component C, provided that the total moles of components B(2), B(3) and C do not exceed 10 mole percent. These mole percent values are based on a total mole percent of dicarboxylic acid and diol residues equal to 100 percent.

The described polyesters are substantially amorphous, i.e., semi-crystalline, and have a glass transition temperature (Tg) in the range of about 25° to 50° C. and a melting point in the range of about 180° to 220° C. These polyesters may be produced by methods generally known in the art for preparing high molecular weight polyesters by polymerizing one or more dicarboxylic acids and one or more diols. The polymers may be produced by direct condensation or ester interchange and may be subjected to known solid-state polymerization methods. The polymerization may be catalyzed by conventional transesterification catalysts such as titanium and tin compounds.

The dicarboxylic acid reactant, or ester-forming derivative thereof such as a dialkyl ester, comprises about 75 to 100 mole percent terephthalic acid, 0 to about 25 mole percent 1,4-cyclohexanedicarboxylic acid and 0 to about 5 mole percent of another dicarboxylic acid. The diol component comprises about 75 to 100 mole percent 1,4-butanediol, 0 to about 20 mole percent ethylene glycol, diethylene glycol or mixtures thereof and 0 to about 5 mole percent of another diol. As is specified above, about 87.5 to 95 percent of the total of the moles of dicarboxylic and diol residues of the polyester are terephthalic acid and 1,4-butane diol residues. The 1,4-cyclohexanedicarboxylic acid or its dialkyl ester used in the preparation of the polyesters may be the trans isomer, the cis isomer or a mixture of trans and cis isomers. The preferred cis:trans ratio is in the range of about 1:1 to 3:1.

The component C compounds include dicarboxylic acids and diols having a molecular weight of not more than about 350, preferably not more than 250. Examples of the component C diacids include isophthalic acid, 2,6-naphthalene-dicarboxylic acid, 4,4'-biphenyldicarboxylic acid, 1,3-cyclohexanedicarboxylic acid, aliphatic dicarboxylic acids containing 4 to 20 carbon atoms such as adipic acid and sebacic acid. Examples of the component C diols include aliphatic diols containing 3 to 20 carbon atoms such as 1,3-propanediol, 2-ethyl-1,3-propanediol, 3-methyl-1,5-pentanediol and 2,2-dimethyl-1,3-propanediol and 1,3- and 1,4-cyclohexanedimethanol. The polyesters which are preferred in manufacturing the articles provided by our invention do not contain a component C residue, i.e., they consist essentially of components A and B. The polymer also may contain up to about 1 weight percent of tri- or tetra-functional compounds in which the functional groups are selected from hydroxy, carboxy and combinations thereof. Minor amounts of other additives commonly employed in polymeric materials such as flame retardants, denesting agents, surface lubricants, ultraviolet light absorbers and colorants or toners may be included in the polyesters provided that such additives do not have a significant adverse effect on the clarity of sheet material and molded articles manufactured from the polyester.

The articles of our invention preferably are fabricated of a polyester composed of about 87.5 to 95.0 mole percent terephthalic acid and 1,4-butanediol residues and about 5.0 to 12.5 mole percent 1,4-cyclohexanedicarboxylic acid residues. Polyesters composed of about 87.5 to 92.5 mole percent terephthalic acid and 1,4-butanediol residues and about 7.5 to 12.5 mole percent 1,4-cyclohexanedicarboxylic acid residues are particularly preferred.

The novel, unoriented polyester sheet material and molded articles of this invention have a thickness of at least 10 mil (254 $\mu$m) and up to about 65 mil (1651 $\mu$m), more typically in the range of 10 to 30 mil, and preferably in the range of 15 to 25 mil. The heat stability (heat distortion temperature, determined according to ASTM D1637) of the sheet material and molded articles is at least 70° C. The minimum heat stability for a particular article will depend on the thickness of the article and the temperatures and period of heating to which it will be exposed. The heat stability temperature normally will be in the range of about 70° to 150° C. with a range of about 90° to 130° C. being preferred.

The degree of clarity or transparency of our novel articles is expressed as a haze value of not more than about 10 nephelometric units as determined by a Hach Model 18900 Ratio Turbidimeter manufactured by and used according to the procedures provided by the Hach Company of Loveland, Colo. Samples of the unoriented polyester articles approximately 3 by 5 cm are placed in the instrument approximately 1 cm in front of the 90° detector. The turbidimeter is calibrated against standards of 1.8, 18 and 180 nephelometric units (Hach Catalog Nos. 18887-01, 18887-02 and 18887-03). The haze values reported for the articles prepared in the examples given herein are the mean of measurements made in 10 different areas of each sample. The haze value of the polyester articles preferably is not more than about 6 nephelometric units.

The novel method of our invention whereby the above-described unoriented, polyester sheet material and molded articles are manufactured comprises the steps of (1) forming a substantially amorphous sheet material or molded article from the polyester defined in detail above and (2) annealing the sheet material or molded article by heating it above its glass transition temperature to effect crystallization of the polyester which results in the annealed article possessing the aforesaid heat stability. The annealing step may be performed by heating the substantially amorphous polyester sheet material at a temperature of at least 80° C. for a period of time sufficient to impart to the resulting article a heat stability (ASTM D1637) of at least 70° C. The substantially amorphous polyester sheet is prepared by extruding or molding the polyester into a sheet, cylinder or other shaped article and then quenching the extruded or molded article by rapidly cooling it. The polyester may be shaped by any process which melts the polymer and extrudes the molten polymer through a die or injects it into a mold. The sheet material may be substantially flat or in the form of a cylinder.

The rapid cooling can be accomplished by any method which provides for the removal of heat from the molten polyester at a rate sufficient to prevent significant crystallization of the polyester. The required heat removal can be accomplished by contacting the extruded or molded polyester melt with a cooled or chilled roll or mold, for example a roll or mold maintained at or below about 15° C. Alternatively, the polyester melt can be contacted with a cold gas to accomplish the necessary rapid cooling. The rapid cooling prevents significant crystallization and thereby permits the formation of an article having good clarity. Thicker articles require a greater heat transfer rate and, consequently, a more rigorous means of cooling to give a clear, substantially amorphous article. The rapid cooling may be effected simultaneously with a shaping step as occurs, for example, when an extruded cylinder of the polyester is enveloped by a chilled mold and the molten polyester is forced outwardly into the mold by means of a gas at superatmospheric pressure.

The second step of the method of our invention comprises annealing or heat-setting the substantially amorphous polyester sheet material or molded article by heating it above its glass transition temperature to effect crystallization of the polyester, i.e., to impart to the sheet material or molded article a heat stability (ASTM D1637) of at least 70° C. The temperature of the sheet or article during the annealing typically is greater than the glass transition temperature and less than the melting point of the polyester. Generally, the annealing step involves heating the sheet or article to a temperature of at least 80° C. for a period of time sufficient to impart to the article the aforesaid heat stability. Depending on the particular temperature used and the thickness of the sheet or molded article, the period of heating may be as short as 5 seconds and as long as 30 minutes. Normally, the annealing temperature will not exceed 180° C. The preferred annealing temperature is in the range of about 100° to 180° C. Prior to the annealing step, the article may be manipulated by various techniques such as vacuum forming at a temperature moderately above, e.g., up to about 10° C. above, the glass transition temperature of the polyester article. The vacuum forming technique of making shaped articles, whereby the substantially amorphous sheet is heated to a temperature slightly above its glass transition temperature and then drawn downwardly by means of vacuum into a mold, may induce a small degree of orientation. However, no specific step, such as stretching, is employed to produce the transparent, heat-stable articles of our invention. The annealing step may be performed concurrently with a molding step, for example by holding the vacuum molded article in a heated mold for a time sufficient to impart the requisite heat stability to the shaped article.

The heat stability of the polyester sheet material and molded articles provided by our invention is due to crystallinity induced by the above described annealing step. The crystalline morphology is different when the polyester is crystallized from the glass than when crystallized from the melt. Crystallization from the melt gives turbidity, but crystallization from the glass preserves transparency. Thus, the quenching or cooling method must be capable of producing transparent sheet material or molded articles, which, when subsequently annealed, will remain transparent.

The articles and methods of our invention are further illustrated by the following examples. The composition of the polyesters described in the examples is based on 100 mole percent diacid component and 100 mole percent diol component. The compositions were determined by NMR spectroscopy. Cis:trans isomer ratios, where mentioned, were determined by gas chromatography analysis. Inherent viscosity (I.V.; dl/g) was measured at 25° C. using 0.5 g polyester per 100 mL of a solvent consisting of 60 parts by weight phenol and 40 parts by weight tetrachloroethane. The haze values reported in the examples were determined as described hereinabove. The glass transition temperatures (Tg) and the melting temperatures (Tm) set forth herein are determined by differential scanning calorimetry at a scan rate of 20° C. per minute. Unless specified otherwise, the annealing step in the examples consisted of heating the amorphous article in a convection oven at the temperatures and for the periods of time reported.

EXAMPLE 1

A polyester composed of 100 mole percent terephthalic acid, 83 mole percent 1,4-butanediol and 17 mole percent ethylene glycol (I.V.=0.87; Tg=42° C.; Tm=205° C.) was compression molded at 245° C. into a sheet 20 mils thick. The molded sheet was quenched in an ice water bath and then heated at 116° C. for 30 minutes. The unoriented sheet had a haze value of 8 nephelometric units and a heat stability of 109° C.

Samples of the amorphous sheet also were annealed by heating the samples for 30 minutes at 56° C., 88° C. or 157° C. The heat stability temperatures (heat distortion temperature; HDT, °C.) of the samples thus annealed and of a sample of the amorphous sheet which had not been annealed (N.A.), determined in accordance with ASTM Procedure D1637, are:

| Annealed At, °C. | HDT, °C. |
| --- | --- |
| N.A. | 61 |
| 56 | 75 |
| 88 | 98 |
| 157 | 119 |

EXAMPLE 2

A polyester composed of 80 mole percent terephthalic acid, 20 mole percent 1,4-cyclohexanedicarboxylic acid (58:42 cis:trans) and 100 mole percent 1,4-butanediol (I.V.=0.89; Tg=23° C.; Tm=189° C.) was compression molded at 230° C. into a sheet 21 mils thick. The molded sheet was quenched in an ice water bath and then heated at 125° C. for 30 minutes. The unoriented sheet had a haze value of 2 nephelometric units.

EXAMPLE 3

A polyester composed of 100 mole percent terephthalic acid, 82 mole percent 1,4-butanediol and 18 mole percent diethylene glycol (I.V.=0.80; Tg=32° C.; Tm=200) was compression molded at 230° C. into a sheet 20 mils thick. The molded sheet was quenched in an ice water bath and then heated at 125° C. for 30 minutes. The unoriented sheet had a haze value of 10 nephelometric units.

EXAMPLE 4

A polyester composed of 80 mole percent terephthalic acid, 20 mole percent 1,4-cyclohexanedicarboxylic acid (58:42 cis:trans) and 100 mole percent 1,4-butanediol (I.V.=0.85; Tg=23° C.; Tm=189° C.) was extruded at 230° C. in the form of a sheet 21 mils thick. The molded sheet was quenched by contacting it with a roll at 14° C., e.g., at a roll contact time of about 2 to 10 seconds. The substantially amorphous polyester sheet was heated to 100° C. and vacuum formed for 20 seconds in a mold having a temperature of 100° C. The formed article was held in the 100° C. mold for 1 minute and then was removed from the mold and heated at 85° C. for 30 minutes. A 14 mil thick sample of the formed article had a haze value of 5 nephelometric units.

EXAMPLE 5

A polyester composed of 100 mole percent terephthalic acid, 81 mole percent 1,4-butanediol and 19 mole percent ethylene glycol (I.V.=0.79; Tg=41° C.; Tm=202° C.) was extruded at 250° C. in the form of a sheet 19 mils thick. The molded sheet was quenched by contacting it with a roll at 15° C. The substantially amorphous polyester sheet was heated to 150° C. and vacuum formed for 12 seconds in a mold having a temperature of 60° C. The formed article was held in the 60° C. mold for 18 seconds and then was removed from the mold and heated at 85° C. for 30 minutes. A 13 mil thick sample of the formed article had a haze value of 6 nephelometric units.

EXAMPLE 6

A polyester composed of 100 mole percent terephthalic acid, 80 mole percent 1,4-butanediol and 20 mole percent ethylene glycol (I.V.=1.05; Tg=43° C.; Tm=201° C.) was extruded at 250° C. in the form of a cylinder and blow molded into bottles using a mold maintained a 6° C. After heating the formed bottle at 60°

C. for 30 minutes, a sample of the sidewall of the bottle 24 mils thick was determined to have a haze value of 2 nephelometric units.

EXAMPLE 7

A polyester composed of 100 mole percent terephthalic acid, 19 mole percent ethylene glycol and 81 mole percent 1,4-butanediol (I.V.=0.79; Tg=41° C.; Tm=202° C.) was extruded at 250° C. in the form of a sheet 19 mils thick. The molded sheet was quenched by contacting it with a roll maintained at 15° C. The substantially amorphous polyester sheet was heated to 125° C. for 30 minutes. The sheet thus formed, quenched and annealed had a haze value of 4 nephelometric units.

EXAMPLE 8

A polyester composed of 100 mole percent terephthalic acid, 81 mole percent 1,4-butanediol and 19 mole percent ethylene glycol (I.V.=0.79; Tg=41° C.; Tm=202° C.) was extruded at 250° C. in the form of a sheet 19 mils thick. The molded sheet was quenched by contacting it with a roll at 15° C. The substantially amorphous polyester sheet then was heated at 153° C. for 30 minutes. The sheet thus formed had a haze value of 10 nephelometric units.

EXAMPLE 9

A polyester composed of 80 mole percent terephthalic acid, 20 mole percent 1,4-cyclohexanedicarboxylic acid (58:42 cis:trans) and 100 mole percent 1,4-butanediol (I.V.=0.85; Tg=23° C.; Tm=189° C.) was extruded at 230° C. in the form of a sheet 20 mils thick. The molded sheet was quenched by contacting it with a roll at 14° C. The substantially amorphous polyester sheet was heated to 125° C. for 30 minutes. The sheet had a haze value of 2.5 nephelometric units.

An amorphous polyester sheet approximately 15 mils thick was prepared using essentially the same polyester and conditions as were used in the above example. Samples of the amorphous sheet were annealed by heating the samples for one hour at 60° C., 80° C. or 100° C. The heat stability temperatures (heat distortion temperature; HDT, ° C.) of the samples thus annealed and of a sample of the amorphous sheet which had not been annealed (N.A.), determined in accordance with ASTM Procedure D1637, are:

| Annealed At, °C. | HDT, °C. |
| --- | --- |
| N.A. | 57 |
| 60 | 79 |
| 80 | 95 |
| 100 | 99 |

A substantially amorphous polyester sheet approximately 13 mils thick was prepared using essentially the same polyester and conditions as were used in the first paragraph of this example. This sheet was thermoformed into the shape of a "dome" lid using a LAB-FORM thermoforming device manufactured by Hydro-Form Corp., West Nyack, N.Y. The sheet was preheated at 50° C. for 20 seconds followed by thermoforming in a 100° C. mold for 30 seconds. The "dome" thus formed had a haze value of 2.5 nephelometric units and a heat deflection temperature of 57° C. which could be increased by annealing as described above. The "dome"-shaped lid is packaged, precooked food designed for heating in a microwave oven.

EXAMPLE 10

A polyester composed of 84 mole percent terephthalic acid, 10 mole percent 1,4-cyclohexane-dicarboxylic acid, 6 mole percent isophthalic acid and 100 mole percent 1,4-butanediol (I.V.=0.75; Tg=28° C.; Tm=202° C.) was compression molded at 230° C. into a 20 mil thick sheet. The sheet was quenched in an ice bath and then heated at 125° C. for 30 minutes. The sheet thus molded, quenched and annealed had a haze value of 4 nephelometric units.

EXAMPLE 11

A polyester composed of 100 mole percent terephthalic acid, 87 mole percent 1,4-butanediol and 13 mole percent ethylene glycol (I.V.=1.03; Tg=42° C.; Tm=211° C.) was compression molded at 245° C. into a sheet 19 mils thick. The molded sheet was quenched in an ice water bath and then heated at 116° C. for 30 minutes. The unoriented sheet had a haze value of 7 nephelometric units and a heat stability of 109° C.

Samples of the amorphous sheet also were annealed by heating the samples for 30 minutes at 56° C., 88° C. or 157° C. The heat stability temperatures (heat distortion temperature; HDT, ° C.) of the samples thus annealed and of a sample of the amorphous sheet which had not been annealed (N.A.), determined in accordance with ASTM Procedure D1637, are:

| Annealed At, °C. | HDT, °C. |
| --- | --- |
| N.A. | 64 |
| 56 | 73 |
| 88 | 95 |
| 157 | 111 |

COMPARATIVE EXAMPLE 1

A polyester composed of 100 mole percent terephthalic acid, 20 mole percent 1,4-cyclohexane-dimethanol and 80 mole percent 1,4-butanediol (I.V.=0.63; Tg=46° C.; Tm=195° C.) was compression molded at 230° C. into a 21 mil thick sheet. The sheet was quenched in an ice bath and then heated at 125° C. for 30 minutes. The sheet thus molded, quenched and annealed had a haze value of 19 nephelometric units.

COMPARATIVE EXAMPLE 2

A polyester composed of 100 mole percent terephthalic acid, 27 mole percent 1,4-cyclohexane-dimethanol and 73 mole percent 1,4-butanediol (I.V.=0.66; Tg=50° C.; Tm=181° C.) was compression molded at 230° C. into a 19 mil thick sheet. The sheet was quenched in an ice bath and then heated at 120° C. for 30 minutes. The sheet thus molded, quenched and annealed had a haze value of >200 nephelometric units.

COMPARATIVE EXAMPLE 3

A polyester composed of 100 mole percent terephthalic acid, 23 mole percent ethylene glycol and 77 mole percent 1,4-butanediol (I.V.=1.10; Tg=45° C.; Tm=197° C.) was compression molded at 245° C. into a 20 mil thick sheet. The sheet was quenched in an ice bath and then heated at 120° C. for 30 minutes. The sheet thus molded, quenched and annealed had a haze value of 45 nephelometric units.

COMPARATIVE EXAMPLE 4

A polyester composed of 80 mole percent terephthalic acid, 20 mole percent 4,4'-sulfonyldibenzoic acid and 100 mole percent 1,4-butanediol (I.V.=0.75; Tg=52° C.; Tm=195° C.) was compression molded at 230° C. into a 20 mil thick sheet. The sheet was quenched in an ice bath and then heated at 120° C. for 30 minutes. The sheet thus molded, quenched and annealed had a haze value of 142 nephelometric units.

COMPARATIVE EXAMPLE 5

A polyester composed of 80 mole percent terephthalic acid, 20 mole percent isophthalic acid and 100 mole percent 1,4-butanediol (I.V.=0.66; Tg=34° C.; Tm=189° C.) was compression molded at 230° C. into a 19 mil thick sheet. The sheet was quenched in an ice bath and then heated at 120° C. for 30 minutes. The sheet thus molded, quenched and annealed had a haze value of 12 nephelometric units.

The invention has been described in detail with particular reference to preferred embodiments thereof, but it will be understood that variations and modifications will be effected within the spirit and scope of the invention.

We claim:

1. An unoriented, polyester sheet material or molded article having a thickness of at least 10 mil (254 μm), a haze value of not more than about 10 nephelometric units as determined by a Hach Model 18900 Ratio Turbidimeter, and a heat stability of at least 70° C. as determined by ASTM D1637, said polyester containing the following components:

A. Dicarboxylic acid residues having the structure:

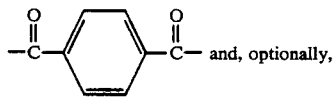 and, optionally,

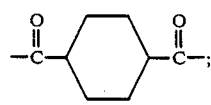

B. Diol residues having the structure:
(1) —OCH₂CH₂CH₂CH₂O— and, optionally,
(2) —OCH₂CH₂O— and/or
(3) —OCH₂CH₂OCH₂CH₂O—; and, optionally,
C. Dicarboxylic acid and/or diol residues other than components A and B;

wherein the polyester is constituted of about 87.5 to 95 mole percent of components A(1) and B(1); about 5 to 12.5 mole percent of components A(2), B(2) and/or B(3); and 0 to about 2.5 mole percent of component C; provided that the total moles of components B(2), B(3) and C do not exceed 10 mole percent.

2. An unoriented, polyester sheet material according to claim 1 having a thickness of 10 to 30 mil, a haze value of not more than about 6 nephelometric units as determined by a Hach Model 18900 Ratio Turbidimeter, and a heat stability of 70° to 150° C. as determined by ASTM D1637.

3. An unoriented, polyester molded article according to claim 1 having a thickness of 10 to 30 mil, a haze value of not more than about 6 nephelometric units as determined by a Hach Model 18900 Ratio Turbidimeter, and a heat stability of 70° to 150° C. as determined by ASTM D1637.

4. An unoriented, polyester sheet material according to claim 1 having a thickness 10 to 30 mil, a haze value of not more than about 6 nephelometric units as determined by a Hach Model 18900 Ratio Turbidimeter, and a heat stability of 70° to 150° C. as determined by ASTM D1637, said polyester containing the following components:

A. Dicarboxylic acid residues having the structure:

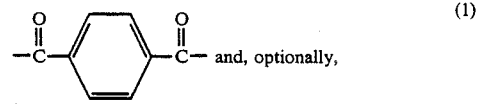

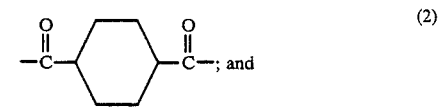

B. Diol residues having the structure:
(1) —OCH₂CH₂CH₂CH₂O— and, optionally,
(2) —OCH₂CH₂O— and/or
(3) —OCH₂CH₂OCH₂CH₂O—;

wherein the polyester is constituted of about 87.5 to 95 mole percent of components A(1) and B(1); about 5 to 12.5 mole percent of components A(2), B(2) and/or B(3); provided that the total moles of components B(2) and B(3) do not exceed 10 mole percent.

5. An unoriented, polyester sheet material according to claim 4 having a thickness of 15 to 25 mil and a heat stability of 90° to 130° C. as determined by ASTM D1637.

6. An unoriented, polyester sheet material having a thickness 10 to 30 mil, a haze value of not more than about 6 nephelometric units as determined by a Hach Model 18900 Ratio Turbidimeter, and a heat stability of 70° to 150° C. as determined by ASTM D1637, said polyester containing the following components:

A. Dicarboxylic acid residues having the structure:

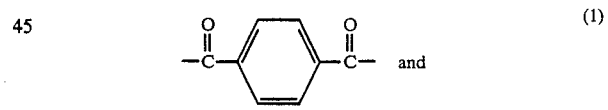

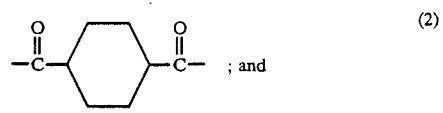

B. Diol residues having the structure:
—OCH₂CH₂CH₂CH₂O—;
wherein the polyester is constituted of about 87.5 to 92.5 mole percent of components A(1) and B and about 7.5 to 12.5 mole percent of component A(2).

7. An unoriented, polyester sheet material according to claim 6 having a thickness of 15 to 25 mil and a heat stability of 90° to 130° C. as determined by ASTM D1637.

8. An unoriented, polyester molded article according to claim 1 having a thickness 10 to 30 mil, a haze value of not more than about 6 nephelometric units as determined by a Hach Model 18900 Ratio Turbidimeter, and a heat stability of 70° to 150° C. as determined by ASTM D1637, said polyester containing the following components:

A. Dicarboxylic acid residues having the structure:

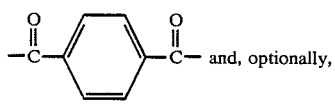 (1)

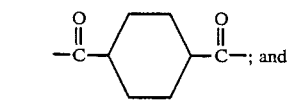 (2)

B. Diol residues having the structure:
(1) —OCH$_2$CH$_2$CH$_2$CH$_2$O— and, optionally,
(2) —OCH$_2$CH$_2$O— and/or
(3) —OCH$_2$CH$_2$OCH$_2$CH$_2$O—;

wherein the polyester is constituted of about 87.5 to 95 mole percent of components A(1) and B(1); about 5 to 12.5 mole percent of components A(2), B(2) and/or B(3); provided that the total moles of components B(2) and B(3) do not exceed 10 mole percent.

9. An article according to claim 8 molded by vacuum forming.

10. An article according to claim 8 molded by extrusion blow molding.

11. An unoriented, polyester molded article according to claim 8 having a thickness of 15 to 25 mil and a heat stability of 90° to 130° C. as determined by ASTM D1637.

12. An unoriented, polyester molded article having a thickness 10 to 30 mil, a haze value of not more than about 6 nephelometric units as determined by a Hach Model 18900 Ratio Turbidimeter, and a heat stability of 70° to 150° C. as determined by ASTM D1637, said polyester containing the following components:

A. Dicarboxylic acid residues having the structure:

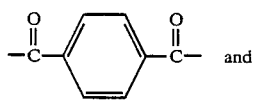 (1)

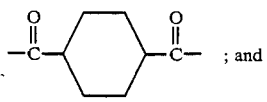 (2)

B. Diol residues having the structure:
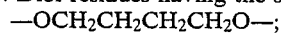

wherein the polyester is constituted of about 87.5 to 92.5 mole percent of components A(1) and B and about 7.5 to 12.5 mole percent of component A(2).

13. An unoriented, polyester molded article according to claim 12 having a thickness of 15 to 25 mil and a heat stability of 90° to 130° C. as determined by ASTM D1637.

14. An article according to claim 13 molded by vacuum forming.

15. An article according to claim 13 molded by extrusion blow molding.

16. A method for manufacturing an unoriented, polyester sheet material or molded article having a thickness of at least 10 mil (254 μm), a haze value of not more than about 10 nephelometric units as determined by a Hach Model 18900 Ratio Turbidimeter, and a heat stability of at least 70° C. as determined by ASTM D1637, said polyester containing the following components:

A. Dicarboxylic acid residues having the structure:

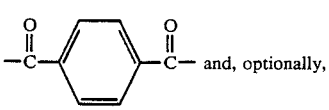 (1)

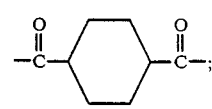 (2)

B. Diol residues having the structure:
(1) —OCH$_2$CH$_2$CH$_2$CH$_2$O— and, optionally,
(2) —OCH$_2$CH$_2$O— and/or
(3) —OCH$_2$CH$_2$OCH$_2$CH$_2$O—; and, optionally, C. Dicarboxylic acid and/or diol residues other than components A and B;

wherein the polyester is constituted of about 87.5 to 95 mole percent of components A(1) and B(1); about 5 to 12.5 mole percent of components A(2), B(2) and/or B(3), and 0 to about 2.5 mole percent of component C, provided that the total moles of components B(2), B(3) and C do not exceed 10 mole percent;

said method comprising the steps of (1) forming a substantially amorphous sheet from said polyester and (2) heating the polyester sheet above its glass transition temperature to effect crystallization of the polyester.

17. The method of claim 16 wherein the step (2) heating is at a temperature of at least 80° C. for a period of time sufficient to impart to the sheet the aforesaid heat stability.

18. The method of claim 16 for manufacturing an unoriented, polyester sheet material having a thickness 10 to 30 mil, a haze value of not more than about 6 nephelometric units as determined by a Hach Model 18900 Ratio Turbidimeter, and a heat stability of 70° to 150° C. as determined by ASTM D1637, said polyester containing the following components:

A. Dicarboxylic acid residues having the structure:

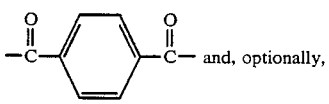 (1)

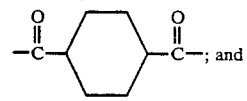 (2)

B. Diol residues having the structure:
(1) —OCH$_2$CH$_2$CH$_2$CH$_2$O— and, optionally,
(2) —OCH$_2$CH$_2$O— and/or
(3) —OCH$_2$CH$_2$OCH$_2$CH$_2$O—;

wherein the polyester is constituted of about 87.5 to 95 mole percent of components A(1) and B(1); about 5 to 12.5 mole percent of components A(2), B(2) and/or B(3), provided that the total moles of components B(2) and B(3) do not exceed 10 mole percent;

said method comprising the steps of (1) forming a substantially amorphous sheet from said polyester and (2) heating the polyester sheet above its glass transition temperature to effect crystallization of the polyester.

19. The method of claim 18 wherein the step (2) heating is at a temperature of at least 80° C. for a period of time sufficient to impart to the sheet the aforesaid heat stability.

20. The method of claim 18 comprising the steps of (1) forming a molten sheet of the polyester and rapidly cooling the molten sheet and (2) heating the polyester sheet at a temperature of about 100° to 180° C. for a period of time sufficient to impart to the sheet a heat stability of 70° to 150° C. as determined by ASTM D1637.

21. The method of claim 18 comprising the steps of (1) forming a molten sheet of the polyester and rapidly cooling the molten sheet, (2) heating the polyester sheet above its glass transition temperature, (3) molding the heated polyester sheet by vacuum forming and (4) heating the molded polyester article at a temperature of about 100° to 180° C. for a period of time sufficient to impart to the molded article a heat stability of 70° to 150° C. as determined by ASTM D1637.

22. A method for manufacturing an unoriented, polyester molded article having a thickness 10 to 30 mil, a haze value of not more than about 6 nephelometric units as determined by a Hach Model 18900 Ratio Turbidimeter, and a heat stability of 70° to 150° C. as determined by ASTM D1637, said polyester containing the following components:

A. Dicarboxylic acid residues having the structure:

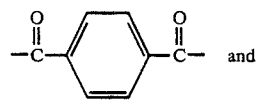

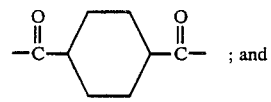

B. Diol residues having the structure:
—OCH$_2$CH$_2$CH$_2$CH$_2$O—;

wherein the polyester is constituted of about 87.5 to 92.5 mole percent of components A(1) and B and about 7.5 to 12.5 mole percent of component A(2); said method comprising the steps of (1) forming a substantially amorphous sheet from said polyester and (2) heating the polyester sheet at or moderately above its glass transition temperature to effect crystallization of the polyester.

23. The method of claim 22 comprising the steps of (1) forming a molten sheet of the polyester and rapidly cooling the molten sheet and (2) heating the polyester sheet at a temperature of about 100° to 180° C. for a period of time sufficient to impart to the sheet a heat stability of 70° to 150° C. as determined by ASTM D1637.

24. The method of claim 22 comprising the steps of (1) forming a molten sheet of the polyester and rapidly cooling the molten sheet, (2) heating the polyester sheet to its glass transition temperature or moderately above, (3) molding the heated polyester sheet by vacuum forming and (4) heating the molded polyester article at a temperature of about 100° to 180° C. for a period of time sufficient to impart to the molded article a heat stability of 70° to 150° C. as determined by ASTM D1637.

* * * * *